US012637599B2

(12) United States Patent
Blodau et al.

(10) Patent No.: US 12,637,599 B2
(45) Date of Patent: May 26, 2026

(54) TWO-COMPONENT POLYURETHANE ADHESIVE COMPOSITION FOR FILM LAMINATION IN HOT FILLING APPLICATION

(71) Applicant: Henkel AG & Co. KGaA, Duesseldorf (DE)

(72) Inventors: Marcel Blodau, Krefeld (DE); Marcel Franken, Neunkirchen-Seelschied (DE); Stefan Tomke, Oberhausen (DE); Sonia Flores Penalba, Cerdanyola del Valles (ES); Nina Jungholt, Issum (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 146 days.

(21) Appl. No.: 18/578,936

(22) PCT Filed: Jul. 16, 2021

(86) PCT No.: PCT/EP2021/069921
§ 371 (c)(1),
(2) Date: Jan. 12, 2024

(87) PCT Pub. No.: WO2023/284975
PCT Pub. Date: Jan. 19, 2023

(65) Prior Publication Data

US 2025/0002767 A1 Jan. 2, 2025

(51) Int. Cl.
*C09J 175/12* (2006.01)
*C09J 5/06* (2006.01)
(Continued)

(52) U.S. Cl.
CPC ............... *C09J 175/12* (2013.01); *C09J 5/06* (2013.01); *C09J 7/35* (2018.01); *C09J 9/00* (2013.01);
(Continued)

(58) Field of Classification Search
None
See application file for complete search history.

(56) References Cited

U.S. PATENT DOCUMENTS

2011/0130512 A1 6/2011 Ludewig et al.
2012/0251479 A1* 10/2012 Thankachan .......... C08G 65/30 424/78.01
(Continued)

FOREIGN PATENT DOCUMENTS

EP 0158893 A1 10/1985
EP 1983011 A1 10/2008
(Continued)

OTHER PUBLICATIONS

International Search Report for International PCT Patent Application No. PCT/EP2021/069918—Mailing date: Mar. 29, 2022.
(Continued)

*Primary Examiner* — Michael N Orlando
*Assistant Examiner* — Abhishek A Patwardhan
(74) *Attorney, Agent, or Firm* — Sun Hee Thomas

(57) ABSTRACT

The present invention relates to a two-component polyurethane adhesive composition for film lamination in hot filling application. Further, the present invention relates to method of manufacturing a laminate by using the two-component polyurethane adhesive composition and the laminate obtainable by the described method.

13 Claims, 1 Drawing Sheet

(51) Int. Cl.

| | |
|---|---|
| ***C09J 7/35*** | (2018.01) |
| ***C09J 9/00*** | (2006.01) |

(52) U.S. Cl.

CPC ...... *C09J 2301/12* (2020.08); *C09J 2301/304* (2020.08); *C09J 2400/163* (2013.01); *C09J 2423/006* (2013.01); *C09J 2467/006* (2013.01)

(56) References Cited

U.S. PATENT DOCUMENTS

| | | | | |
|---|---|---|---|---|
| 2013/0079431 | A1* | 3/2013 | Smiecinski ........ | C08G 18/2063 521/137 |
| 2013/0231445 | A1 | 9/2013 | Vendamme et al. | |
| 2018/0186919 | A1 | 7/2018 | Zupancic et al. | |
| 2018/0187049 | A1* | 7/2018 | Tabakovic ................. | C09J 5/06 |
| 2019/0048124 | A1 | 2/2019 | Strand et al. | |
| 2019/0092946 | A1 | 3/2019 | Andersen et al. | |
| 2019/0202973 | A1* | 7/2019 | Laas .................... | C08G 18/227 |
| 2020/0263064 | A1 | 8/2020 | Chen et al. | |
| 2022/0010182 | A1 | 1/2022 | Frinault et al. | |
| 2024/0301259 | A1 | 9/2024 | Blodau et al. | |

FOREIGN PATENT DOCUMENTS

| | | | |
|---|---|---|---|
| EP | 3660072 | A1 | 6/2020 |
| JP | 2013142128 | A | 7/2013 |
| JP | 2013540184 | A | 10/2013 |
| JP | 2021500419 | A | 1/2021 |
| JP | 2024526797 | A | 7/2024 |
| WO | 2006026670 | A1 | 3/2006 |
| WO | 2018058016 | A1 | 3/2018 |
| WO | 2018073102 | A1 | 4/2018 |
| WO | 2018143446 | A1 | 8/2018 |

OTHER PUBLICATIONS

International Search Report for International PCT Patent Application No. PCT/EP2021/069921—Mailing date: Mar. 18, 2022.

International Search Report for International PCT Patent Application No. PCT/EP2021/069922—Mailing date: Mar. 29, 2022.

International Search Report for International PCT Patent Application No. PCT/EP2021/069916—Mailing date: Mar. 18, 2022.

* cited by examiner

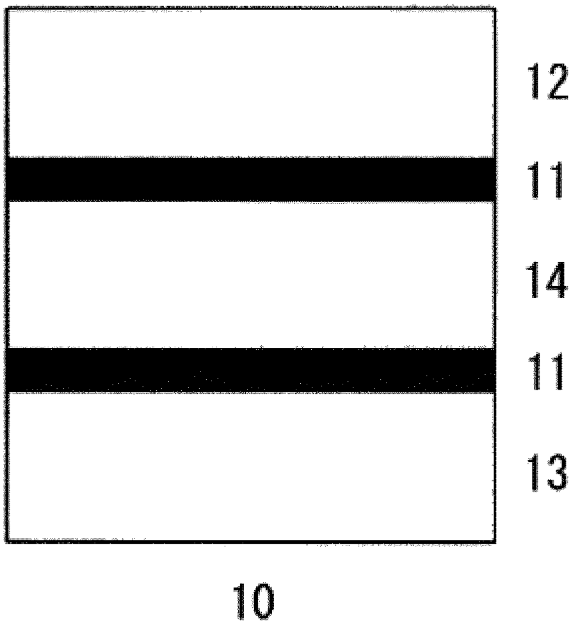
12
11
14
11
13
10

TWO-COMPONENT POLYURETHANE ADHESIVE COMPOSITION FOR FILM LAMINATION IN HOT FILLING APPLICATION

TECHNICAL FIELDS

The present invention relates to a two-component polyurethane adhesive composition for film lamination in hot filling application. Further, the present invention relates to method of manufacturing a laminate by using the two-component polyurethane adhesive composition and the laminate obtainable by the described method.

BACKGROUND

Product packaging has been changing from sealed metal cans and glass bottles to sealed flexible packages such as pouches. As one example animal or human food is now available in both traditional metal cans and flexible pouches. The flexible package when filled with a food or other product and closed or sealed can be readily changed in shape. The flexible package is typically prepared from two layers of flexible packaging material that are overlaid and sealed around most of their periphery to form a cavity inside. Typically, the two layers of flexible packaging material are heat sealed by applying heat and pressure to fuse the layers together around a thin portion of the package periphery. Food or other product is placed in the cavity through an opening and the opening is closed by heat sealing the layers together. The sealed package and enclosed product can be heated for preservation purposes. In some demanding applications such as hot filling, the sealed package has to withstand high temperatures up to 90° C.

Flexible packaging material is prepared by laminating two or more layers of film. Each film is chosen for specific properties. For example, a flexible packaging material can be a lamination of three layers. The inner layer will contact the packaged product. Polypropylene has desirable product contact properties as well as heat sealability and can be used as an inner layer. The middle layer will provide a barrier to moisture, oxygen and/or light. Metal films or foils have desirable barrier properties and metal films such as aluminium foil can be used as a middle layer. The outer layer will provide protection for the package and also provides a surface for printing information such as contents, packaging date, warnings, etc. Polyester films are tough, can receive printing ink and can be used as an outer layer. Flexible packaging material can range in thickness from about 1 μm to about 75 μm.

Each layer of the flexible packaging material is bonded to the adjacent layer by an adhesive. Adhesive can be applied to the layer from a solution in a suitable solvent using gravure or smooth roll coating cylinders or from a solvent-free state using special application machinery and that layer is laminated to another layer. The laminated packaging material is dried if necessary and accumulated in rolls. The rolls are kept in storage for a predetermined amount of time to allow the adhesive to cure before use in some applications.

Although there are many possible types of adhesives, polyurethane based adhesives are preferred for use in flexible packaging materials because of their many desirable properties including good adhesion to the materials in each layer, high bonding strength, resistance to heat such as from heat sealing or retorting, and resistance to chemically aggressive products. Typically, an isocyanate-containing polyurethane prepolymer obtained by the reaction of excess diisocyanate with a polyether and/or polyester containing two or more active hydrogen groups per molecule is used in combination with a second component. The second component is usually a polyether polyol and/or a polyester polyol. The two components are combined just before use and in a predetermined ratio and applied on one of the film surfaces and the coated film is laminated to another substrate.

One concern which has been taken for flexible packaging material manufactured for the use as food packaging is government regulations. Government regulations require that the food packaging be safe when in contact with food. Following the 11th Amendment to the EU Plastics Regulation (EU 10/2011), 3-glycidyloxypropyltrimethoxysilane (GLYMO) commonly used as adhesion promoter in the current adhesive products for bonding flexible packaging materials has been assessed as potentially genotoxic. A limit of 0.15 μg/kg has been defined to ensure its safe use for food applications. The substance is explicitly allowed to be used. Nevertheless, it also means the packaging producer has to verify that its concentration as well as that of its derivates remains below the specified migration limits under conditions of use.

However, polyurethane adhesives for hot filling applications must withstand high thermal and chemical requirements without decreasing the adhesive strength and the ease for application. Therefore, it would be desirable to provide a polyurethane adhesive composition containing no GLYMO or other epoxidized silane for bonding flexible films for packaging, especially in high-temperature food contact and medical retort applications.

SUMMARY OF THE INVENTION

A first object of the invention is to provide a two-component polyurethane adhesive composition comprising a polyol component and an isocyanate component, wherein the polyol component comprises at least one polyester polyol being a reaction product of at least one cycloaliphatic polyol, at least one heterocyclic polyol, at least one linear or branched aliphatic polyol, and at least one polyfunctional carboxylic acid, and the isocyanate component comprises at least one alkoxysilane functionalized isocyanate compound having no epoxide group, at least one aromatic isocyanate-functionalized compound, and at least one aliphatic or alicyclic isocyanate-functionalized compound, the cured adhesive thereof, and the manufacturing method thereof.

Another object of the invention is to provide a laminate of flexible packaging comprising the cured adhesive and the manufacturing method thereof.

BRIEF DESCRIPTION OF THE DRAWING

FIG. 1 shows a sectional view of a food packaging film according to the present invention.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

As used herein, the singular forms “a”, “an” and “the” include both singular and plural referents unless the context clearly dictates otherwise.

The terms “comprising”, “comprises” and “comprised of” as used herein are synonymous with “including”, “includes” or “containing”, “contains”, and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety. If reference is made herein to a molecular weight of a polymer, this reference refers to the average number weight $M_n$, unless stated otherwise. The number average molecular weight $M_n$ of a polymer can, for example, be determined by gel permeation chromatography (GPC) according to DIN 55674 with THF as the eluent. If not stated otherwise, all given molecular weights are those determined by GPC, calibrated with polystyrene standards. The average molecular weight $M_w$ can also be determined by GPC, as described for $M_n$.

The disclosed two-component polyurethane adhesive composition comprises or consists of a polyol component and an isocyanate component, wherein the polyol component comprises at least one polyester polyol being a reaction product of at least one cycloaliphatic polyol, at least one heterocyclic polyol, at least one linear or branched aliphatic polyol, and at least one polyfunctional carboxylic acid, and the isocyanate component comprises at least one alkoxysilane functionalized isocyanate compound having no epoxide group, at least one aromatic isocyanate-functionalized compound, and at least one aliphatic or alicyclic isocyanate-functionalized compound. The two-component polyurethane adhesive composition comprises essentially no, and preferably no alkoxysilane having epoxide group, such as GLYMO. The polyol component and the isocyanate component are stored separately and mixed in a predetermined ratio just before use.

Polyol Component

The polyol component in the two-component polyurethane adhesive composition comprises or consists of a polyester polyol obtained from a reaction mixture comprising at least one cycloaliphatic polyol, at least one heterocyclic polyol, at least one linear or branched aliphatic polyol, and at least one polyfunctional carboxylic acid.

Generally, there is no limitation to the molecular weight of the polyester polyol used in the adhesive composition as long as it has no negative effect on the properties of the adhesive composition and the cured adhesive. Preferably, the polyester polyol has a molecular weight $M_n$ of 200 to 20,000 g/mol, in particular 1,000 to 10,000 g/mol.

In the present invention, the polyester polyol preferably may have an acid value of 0.1 to 2 mgKOH/g. When the acid value of the polyester polyol is within the above range, the adhesive composition for food packaging films of the present invention has a viscosity more suited for application and is excellent in adhesion to a film. On the assumption that all acid groups included in 1 g of the resin are free acids, the “acid value” of the polyester polyol according to the present invention is expressed by a calculated value of a number of milligrams of potassium hydroxide which is needed to neutralize the acid. Therefore, even though the acid groups exist as a base in an actual system, they are assumed as a free acid. The “acid value” according to the present invention is determined by dissolving the polyester polyol in a solvent, adding phenolphthalein as an indicator, and titrating with a 0.1 mol/l potassium hydroxide-ethanol solution according to DIN 53240.

In the present invention, the polyester polyol may have a hydroxyl value of 5 to 350 mgKOH/g. When the hydroxyl value of the polyester polyol is within the above range, the adhesive composition for food packaging films of the present invention has a viscosity more suited for application and is more excellent in adhesion to a film. As used herein, the hydroxyl value means a number of mgs of potassium hydroxide which is required to neutralize acetic acid bonding to the hydroxyl group when 1 g of the resin is acetylated.

The “hydroxyl value” according to the present invention is determined according to DIN 51558 by adding an acetylation reagent to the polyester polyol, heating with a glycerine solution, allowing to cool, then adding phenolphthalein as an indicator, and titrating with a potassium hydroxide-ethanol solution.

In the present invention, the polyester polyol may have a glass transition temperature of −20° C. to 100° C. The glass transition temperature of the polyester polyol is measured using a differential scanning calorimeter. With respect to a proper amount of a sample, a DSC curve was measured at a temperature rise rate of 10° C./minute and the temperature of an inflection point of the obtained DSC curve was regarded as the glass transition temperature.

In the present invention, the polyester polyol appears in liquid form at room temperature. Such polyester polyol can provide ease for further processing in formulating the adhesive composition.

The cycloaliphatic polyol may have one, two or more rings and two or more hydroxy groups. Preferably, the cycloaliphatic polyol is selected from 1,4-cyclohexanedimethanol, cyclobutanediol, cyclopentanediol, 1,4-cyclohexanediol, cycloheptanediol, cyclooctanediol, cyclohexanedimethanol, tricyclo[5.2.1.0.2.6]decanedimethanol, bicyclo[4.3.0]-nonanediol, dicyclohexanediol, tricyclo[5.3.1.1]dodecanediol, bicyclo[4.3.0]nonanedimethanol, tricyclo[5.3.1.1]dodecanediethanol, spiro[3.4]octanediol, butylcyclohexanediol, 1,1'-bicyclohexylidenediol, cyclohexanetriol, hydrogenated bisphenol A, 1,3-adamantanediol, and mixture thereof. More preferably, the cycloaliphatic polyol is selected from 1,4-cyclohexanedimethanol, 1,4-cyclohexanediol, and mixture thereof. In particular, the cycloaliphatic polyol is 1,4-cyclohexanedimethanol (CHDM).

The cycloaliphatic polyol is present in the reaction mixture of the polyester polyol in an amount of 1% to 25% by weight, and preferably 2% to 20% by weight based on the weight of the reaction mixture. If the amount is lower, the adhesion performance may be deteriorated. If the amount is higher, the obtained polyester polyol may be in solid form even at reaction temperature and cannot be further processed.

The heterocyclic polyol may have one, two or more rings, and preferably have two or more rings and two or more hydroxy groups. It may be selected from 1,4:3,6-dianhydrohexitol (such as isosorbide, isomannide, or isoidide), spiroglycol, 2,4:3,5-di-O-methylenemannitol, and 2,3:4,5-di-O-methylenegalactose, and preferably is selected from isosorbide, spiroglycol, 2,4:3,5-di-O-methylenemannitol, and 2,3:4,5-di-O-methylenegalactose as shown below, and in particular is isosorbide.

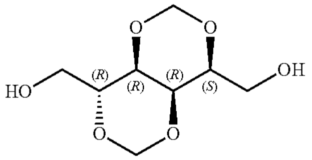

2,3:4,5-di-O-methylenegalactose

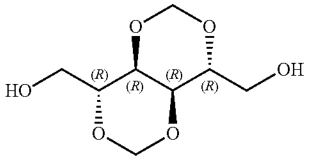

2,4:3,5-di-O-methylenemannitol

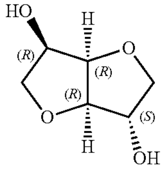

isosorbide

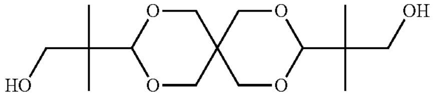

spiroglycol

The heterocyclic polyol is present in the reaction mixture of the polyester polyol in an amount of 1% to 40% by weight, preferably 2% to 30% by weight based on the weight of the reaction mixture.

The linear or branched aliphatic polyol may have a low molecular weight and two or more hydroxy groups. Examples of the linear or branched aliphatic polyol are ethylene glycol, propylene glycol (such as 1,2-propylene glycol and 1,3-propylene glycol), glycerol, pentaerythritol, trimethylolpropane, 1,4,6-octanetriol, butanediol, pentanediol, hexanediol, dodecanediol, octanediol, chloropentanediol, glycerol monoallyl ether, glycerol monoethyl ether, diethylene glycol, 2-ethylhexanediol-1,4, 1,2,6-hexanetriol, 1,3,5-hexanetriol, 1,3-bis-(2-hydroxyethoxy)propane. In one embodiment, neopentyl glycol and hexanediol are not used in the adhesive composition due to the concern of migration potential. In another embodiment, it is more preferable to use the linear or branched aliphatic polyol such as diethylene glycol and/or propylene glycol.

The linear or branched aliphatic polyol is present in the reaction mixture of the polyester polyol in an amount of 1% to 40% by weight, preferably 2% to 25% by weight based on the weight of the reaction mixture.

The polyester polyols are preparable by polycondensation of the above-mentioned polyols with a substoichiometric amount of a polyfunctional carboxylic acid to form polyester polyols according to preparation method known in the art. Preferably the polyfunctional carboxylic acids have from 2 to 14 carbon atoms, such as dicarboxylic acids and/or tricarboxylic acids, or their reactive derivatives. Examples of the dicarboxylic acid include oxalic acid, malonic acid, succinic acid, glutaric acid, adipic acid, pimelic acid, suberic acid, azelaic acid, sebacic acid, decanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, phthalic acid, terephthalic acid, isophthalic acid, naphthalenedicarboxylic acid, trimellitic acid, trimesic acid, cyclohexanedicarboxylic acid and the like. These dicarboxylic acids are used alone or in combination. Examples of the carboxylic anhydride include acetic anhydride, propionic anhydride, succinic anhydride, maleic anhydride, phthalic anhydride, and trimellitic anhydride. These dicarboxylic anhydrides are used alone or in combination. In one embodiment, the polyfunctional carboxylic acids are selected from adipic acid, azelaic acid, terephthalic acid, isophthalic acid and mixture thereof.

The polyfunctional carboxylic acid is present in the reaction mixture of the polyester polyol in an amount of 30% to 70% by weight, preferably 35% to 60% by weight based on the weight of the reaction mixture.

The reaction mixture may optionally comprise at least one catalyst to accelerate the reaction of the polyols and the polyfunctional carboxylic acid.

Suitable catalysts are, for example, compounds corresponding to general formula I:

$$M(OR^1)_x \qquad (I)$$

in which M is a metal selected from the group consisting of aluminium, titanium, magnesium or zirconium and $R^1$ stands for the same or different, linear or branched hydrocarbon radicals containing 1 to 8 carbon atoms and x has a value of 2, 3 or 4. Suitable catalysts are, for example, aluminium alkoxides, titanium alkoxides, magnesium alkoxides and zirconium alkoxides. Particularly suitable catalysts are, for example, aluminium trimethoxide, aluminium triethoxide, aluminium triisopropoxide, aluminium trisec·butoxide, aluminium tritert·butoxide, titanium(IV) methoxide, titanium(IV) ethoxide, titanium(IV) isopropoxide, titanium(IV) butoxide, titanium(IV) 2-ethylhexoxide, zirconium(IV) ethoxide, zirconium(IV) propoxide, zirconium(IV) butoxide, zirconium(IV) isopropoxide, zirconium (IV) tert·butoxide, magnesium methoxide, magnesium ethoxide, magnesium butoxide, magnesium propoxide or magnesium phenoxide.

Other suitable catalysts for the process according to the invention are tin compounds, more particularly organotin carboxylates, such as dibutyltin dilaurate, dibutyltin diacetate, dibutyltin bis-(2-ethylhexanoate) or other organotin compounds, such as dibutyltin oxide, dibutyltin dimethoxide, dibutyltin dibromide, dibutyltin dichloride, ditert·butyltin dichloride, dimethyltin dibromide, dimethyltin dichloride, diphenyltin dichloride or tin octoate. Of the catalysts mentioned, dibutyltin dilaurate, dibutyltin oxide and dibutyltin diacetate are preferred.

Other suitable catalysts are compounds which contain at least one metal selected from the group consisting of antimony, iron, cobalt, nickel, copper, chromium, manganese, molybdenum, tungsten or lead. The oxides, halides, carboxylates, phosphates or organometallic compounds of the metals mentioned are particularly suitable. Examples of particularly suitable catalysts include iron acetate, iron benzoate, iron naphthenates; iron acetyl acetonates, manganese acetate, manganese naphthenate and manganese acetyl acetonate.

The catalyst is present in the reaction mixture of the polyester polyol in an amount of 0% to 0.1% by weight, preferably 0.0001% to 0.05% by weight based on the weight of the reaction mixture.

It is known to a person skilled in the art for preparing the polyester polyol according to the present invention. A typical preparation method comprises the steps (1) providing at least one cycloaliphatic polyol, at least one heterocyclic polyol, at least one linear or branched aliphatic polyol, and at least one polyfunctional carboxylic acid to form a mixture, (2) heating stepwise the mixture to 200° C. to 220° C. and maintaining 20 to 40 hours under nitrogen flow, (3)

reducing the pressure stepwise to 10-300 mbar to complete the reaction, and (4) cooling the reaction mixture when the acid value of the reaction mixture is no more than 2, and obtaining a polyester polyol, wherein at least one catalyst is optionally added in the mixture in step (1) and/or (2).

In addition to the polyester polyol, polyacetals and polyether polyols may be also added in the polyol component. By polyacetals are meant compounds obtainable from glycols reacted with aldehydes, for example, diethylene glycol or hexanediol or a mixture thereof condensed with formaldehyde. Polyacetals which can be used in the context of the disclosure may likewise be obtained by the polymerization of cyclic acetals.

The polyether polyol preferably a polyether diol which comprises primary hydroxyl groups or a mixture of primary and secondary hydroxyl groups may also be comprised in the polyol component. Examples of suitable polyether polyols are polyoxyalkylene polyols such as polyethylene glycol, polypropylene glycol, polytetramethylene glycol and polybutylene glycol. Also, homopolymers or copolymers of the listed polyoxyalkylene polyols as well as mixtures thereof are suitable for the purpose of the present invention. Particularly suitable copolymers are those comprising an adduct of a compound selected from the group consisting of ethylene glycol, propylene glycol, diethylene glycol, propylene glycol, triethylene glycol, 2-ethylhexandiol-1,3-glycerine, trimethylolpropane, trimethylolethane, tris(hydroxyphenyl) propane, triethanolamine and triisopropylamine with at least one compound selected from the group consisting of ethylene oxide, propylene oxide and butylene oxide.

Further suitable polyols include polycarbonates. Polycarbonates can be obtained, for example, by reacting diols, such as propylene glycol, butane-1,4-diol or hexan-1,6-diol, diethylene glycol, triethylene glycol or tetraethylene glycol, or mixtures of two or more thereof, with diaryl carbonates, for example, diphenyl carbonate, or phosgene.

Likewise suitable used in the polyol component are polyacrylates which carry hydroxy groups. These polyacrylates are obtainable, for example, by polymerizing ethylenically unsaturated monomers which carry an OH group. Monomers of this kind are obtainable, for example, by esterifying ethylenically unsaturated carboxylic acids and difunctional alcohols, the alcohol generally being present in a slight excess. Examples of ethylenically unsaturated carboxylic acids suitable for this purpose are acrylic acid, methacrylic acid, crotonic acid or maleic acid. Corresponding esters carrying OH groups are, for example, 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate or 3-hydroxypropylmethacrylate or mixtures of two or more thereof.

In one preferred embodiment, the reaction mixture from which the polyester polyol according to the invention is obtained comprises, based on the total weight of the reaction mixture:

i) 30% to 70% by weight, preferably 35% to 60% by weight of at least one polyfunctional carboxylic acid;
ii) 1% to 40% by weight, preferably 2% to 30% by weight of at least one heterocyclic polyol;
iii) 1% to 25% by weight, preferably 2% to 20% by weight of at least one cycloaliphatic polyol;
iv) 1% to 40% by weight, preferably 2% to 25% by weight of at least one linear or branched aliphatic polyol; and
v) 0% to 0.1% by weight, preferably 0.0001% to 0.05% by weight of at least one catalyst.

Isocyanate Component

An isocyanate component is reacted with the polyol component so as to extend the chain length of the polyol to obtain a polyurethane adhesive. According to the present invention, the isocyanate component comprises or consists of at least one alkoxysilane functionalized isocyanate compound having no epoxide group, at least one aromatic isocyanate-functionalized compound, and at least one aliphatic or alicyclic isocyanate-functionalized compound.

The alkoxysilane functionalized isocyanate compound having no epoxide group are known in the art and can be a reaction product of at least one aliphatic or alicyclic isocyanate-functionalized compound and at least one hydrolyzable alkoxysilane compound having no epoxide group. Such alkoxysilane functionalized isocyanate compound can be prepared in accordance with EP 0158893 A1 by reacting for example, at least one hydrolyzable alkoxysilane compound having no epoxide group with an excess of at least one aliphatic or alicyclic isocyanate-functionalized compound.

The aliphatic or alicyclic isocyanate-functionalized compound may be any one of an aliphatic isocyanate and an alicyclic isocyanate monomer and/or oligomer such as dimer or trimer as long as the objective adhesive of the present invention can be obtained. It is preferred to include an aliphatic isocyanate or an alicyclic isocyanate monomer or oligomer, considering the adhesive is used for food packaging applications.

As used herein, the "aliphatic isocyanate" means a monomer or oligomer which has a chain-like hydrocarbon chain to which an isocyanate group is directly bonded, and also has no cyclic hydrocarbon chain. The "aliphatic isocyanate" may have an aromatic ring, but the isocyanate group is not bonded directly to the aromatic ring. Furthermore, as used herein, the cyclic hydrocarbon chain does not contain aromatic rings.

The "alicyclic isocyanate" means a monomer or oligomer which has a cyclic hydrocarbon chain, and may have a chain-like hydrocarbon chain. The isocyanate group may be directly bonded to the cyclic hydrocarbon chain, or may be directly bonded to a chain-like hydrocarbon chain which may be present. Although the "alicyclic isocyanate" may have an aromatic ring, the isocyanate group is not directly bonded to the aromatic ring.

Therefore, for example, 4,4'-diphenylmethane diisocyanate corresponds to the aromatic isocyanate, since the isocyanate group is directly bonded to the aromatic ring. On the other hand, for example, xylylene diisocyanate corresponds to the aliphatic isocyanate, although it has an aromatic ring, since the isocyanate group is not directly bonded to the aromatic ring and is bonded to the methylene group. The aromatic ring may have a ring-fused structure in which two or more benzene rings are condensed.

Examples of the aliphatic isocyanate include 1,2-ethylene diisocyanate, 1,4-tetramethylene diisocyanate, 1,6-hexamethylene diisocyanate (HDI), 2,2,4(2,4,4)-trimethyl-1,6-hexamethylene diisocyanate (TMDI), 1,9-diisocyanato-5-methylnonane, 1,8-diisocyanato-2,4-dimethyloctane, 1,12-dodecane diisocyanate, ω,ω'-diisocyanatodipropyl ether, 3-isocyanatomethyl-3,5,5-trimethylcyclohexyl isocyanate (isophorone diisocyanate, IPDI), 1,4-diisocyanatomethyl-2,3,5,6-tetramethylcyclohexane, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, xylyl diisocyanate (XDI), tetramethylxylyl diisocyanate (TMXDI), methyl 2,6-diisocyanatohexanoate (lysine diisocyanate), and the dimer or trimer thereof, such as IPDI trimers and HDI trimers.

Examples of the alicyclic isocyanate include 5-isocyanato-1-isocyanatomethyl-1,3,3-trimethylcyclohexane (isophorone diisocyanate), 1,3-bis(isocyanatomethyl)cyclohexane (hydrogenated xylylene diisocyanate), bis(4-isocyanatocyclohexyl)methane (hydrogenated diphenylmethane diisocyanate), 1,4-diisocyanatocyclohexane and the oligomer thereof.

The aliphatic or alicyclic isocyanate-functionalized compound is also preferably a compound having 3 or more isocyanate groups. Such isocyanate-functionalized compound is preferably an adduct of various polyisocyanates with polyols such as 2-methylpentane-2,4-diol and trimethylolpropane, such as an adduct of diisocyanate such as HDI, XDI, and IPDI with trimethylolpropane, and a trimer having an isocyanurate ring. As the polyisocyanate-modified product, a carbodiimide group, a uretdione group, a uretonimine group, a burette group reacted with water, a group of isocyanurate groups, or a modified product having two or more of these groups can be used.

In a preferred embodiment, the aliphatic or alicyclic isocyanate-functionalized compound is selected from IPDI, HDI, XDI, their adducts, their oligomers and the mixture of above.

To form the alkoxysilane functionalized isocyanate compound, hydrolyzable silane compounds having no epoxide group are used. Such hydrolyzable silane compounds which have at least one functional group that is reactive toward isocyanate groups are known to the skilled person. Functional groups reactive toward isocyanate groups are, in particular, OH groups, thiol groups, carboxyl groups, primary and secondary amino groups, and mixtures thereof, preferably carboxyl groups, primary and secondary amino groups, and mixtures thereof, more preferably primary and secondary amino groups.

Examples of such hydrolyzable silane compounds which contain at least one primary and/or secondary amino group are 3-aminopropyltrimethoxysilane (APS), 3-aminopropyltriethoxysilane, 3-aminopropyltriisopropoxysilane, 2-aminoethyl-trimethoxysilane, 2-amino ethyltriethoxysilane, 2-aminoethyltriisopropoxysilane, aminomethyltrimethoxysilane, aminomethyltriethoxysilane, aminomethyl-triisopropoxysilane, 3-(2-aminoethyl)aminopropyltrimethoxysilane, 3-(2-aminoethyl)aminopropyltriethoxysilane, 3-(2-aminoethyl)aminopropyltriiso-propoxysilane, 2-(2-aminoethyl)aminoethyltrimethoxysilane, 2-(2-aminoethyl)-aminoethyltriethoxysilane, 2-(2-aminoethyl) aminoethyltriisopropoxysilane, 3-(3-aminopropyl) aminopropyltrimethoxysilane, 3-(3-aminopropyl) aminopropyl-triethoxysilane, 3-(3-aminopropyl) aminopropyltriisopropoxysilane, diethylenetriaminopropyltrimethoxysilane, diethylenetriaminopropyltriethoxysilane, N-(n-butyl)-3-aminopropyltrimethoxysilane, N-(n-butyl)-3-aminopropyltriethoxysilane, N-cyclohexylaminomethyltriethoxysilane, N-cyclohexylaminomethyltrimethoxysilane, N-ethyl-γ-aminoisobutyltrimethoxysilane, N-ethyl-γ-aminoisobutyltriethoxysilane, N-(vinylbenzyl)-2-aminoethyl-3-aminopropyltrimethoxysilane hydrochloride, N-phenyl-γ-aminopropyltrimethoxysilane, N-phenyl-γ-aminopropyltriethoxysilane, γ-ureidopropyltrimethoxysilane, γ-ureidopropyltriethoxysilane, N-methyl[3-(trimethoxysilyl)propyl]carbamate, and/or N-trimethoxysilylmethyl-O-methylcarbamate, and also bis [γ-(triethoxysilyl)propyl]amine and bis[γ-(trimethoxysilyl) propyl]amine.

Examples of hydrolyzable silane compounds which contain at least one thiol group are 3-mercaptopropyltrimethoxysilane, 3-mercaptopropyltriethoxysilane, 3-mercaptopropyltriisopropoxysilane, 2-mercaptoethyltrimethoxysilane, 2-mercaptoethyltriethoxysilane and/or 2-mercaptoethyltriisopropoxysilane.

In one preferred embodiment, bis[γ-(triethoxysilyl)propyl]amine and bis[γ-(trimethoxysilyl)propyl]amine are particularly preferred as the hydrolyzable silane compound.

The at least one alkoxysilane functionalized isocyanate compound is present in isocyanate component in an amount of 1% to 40% by weight, preferably 5% to 20% by weight based on the weight of the isocyanate component.

According to the present invention, the isocyanate component further comprises at least one aromatic isocyanate-functionalized compound. Examples of the aromatic isocyanate-functionalized compound include but not limited to 2,4- or 4,4'-diphenyl methane diisocyanate (MDI), the isomers of toluene diisocyanate (TDI), naphthalene-1,5-diisocyanate (NDI), the adduct thereof, the oligomer thereof, and the mixture of above. However, in view of the potential toxicity concern, MDI is not preferred. In one preferred embodiment, the aromatic isocyanate-functionalized compound is selected from the isomers of toluene diisocyanate (TDI) such as 2,4-TDI or 2,6-TDI and its oligomers, for example Loctite LA 5000 commercially available from Henkel.

The at least one aromatic isocyanate-functionalized compound is present in the isocyanate component in an amount of 30% to 90% by weight, preferably 40% to 70% by weight based on the weight of the isocyanate component.

In addition, the isocyanate component further comprises at least one aliphatic or alicyclic isocyanate-functionalized compound.

The aliphatic or alicyclic isocyanate-functionalized compound may be any one of an aliphatic isocyanate and an alicyclic isocyanate monomer and/or oligomer such as dimer or trimer as long as the objective adhesive of the present invention can be obtained. It is preferred to include an aliphatic isocyanate or an alicyclic isocyanate monomer or oligomer, considering the adhesive is used for food packaging applications.

Examples of the aliphatic isocyanate include 1,2-ethylene diisocyanate, 1,4-tetramethylene diisocyanate, 1,6-hexamethylene diisocyanate (HDI), 2,2,4(2,4,4)-trimethyl-1,6-hexamethylene diisocyanate (TMDI), 1,9-diisocyanato-5-methylnonane, 1,8-diisocyanato-2,4-dimethyloctane, 1,12-dodecane diisocyanate, ω,ω'-diisocyanatodipropyl ether, 3-isocyanatomethyl-3,5,5-trimethylcyclohexyl isocyanate (isophorone diisocyanate, IPDI), 1,4-diisocyanatomethyl-2,3,5,6-tetramethylcyclohexane, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, xylyl diisocyanate (XDI), tetramethylxylyl diisocyanate (TMXDI), methyl 2,6-diisocyanatohexanoate (lysine diisocyanate), and the dimer or trimer thereof, such as IPDI trimers and HDI trimers.

Examples of the alicyclic isocyanate include 5-isocyanato-1-isocyanatomethyl-1,3,3-trimethylcyclohexane (isophorone diisocyanate), 1,3-bis(isocyanatomethyl)cyclohexane (hydrogenated xylylene diisocyanate), bis(4-isocyanatocyclohexyl)methane (hydrogenated diphenylmethane diisocyanate), 1,4-diisocyanatocyclohexane and the oligomer thereof.

The aliphatic or alicyclic isocyanate-functionalized compound is also preferably a compound having 3 or more isocyanate groups. Such isocyanate-functionalized compound is preferably an adduct of various polyisocyanates with polyols such as 2-methylpentane-2,4-diol and trimethylolpropane, such as an adduct of diisocyanate such as HDI, XDI, and IPDI with trimethylolpropane, and a trimer having an isocyanurate ring. As the polyisocyanate-modified product, a carbodiimide group, a uretdione group, a uretonimine group, a burette group reacted with water, a group of isocyanurate groups, or a modified product having two or more of these groups can be used.

In a preferred embodiment, the aliphatic or alicyclic isocyanate-functionalized compound is selected from IPDI, HDI, XDI, their adducts, their oligomers and the mixture of above.

The aliphatic or alicyclic isocyanate-functionalized compounds used as the reactant of the alkoxysilane functionalized isocyanate compound having no epoxide group and as the single ingredient in the isocyanate component can be the same or different. In one embodiment, the aliphatic or alicyclic isocyanate-functionalized compounds used as the reactant of the alkoxysilane functionalized isocyanate compound having no epoxide group and as the single ingredient in the isocyanate component are selected from HDI and its oligomers such as HDI trimer.

The at least one aliphatic or alicyclic isocyanate-functionalized compound used as single component is present in the isocyanate component in an amount of 1% to 50% by weight, preferably 10% to 40% by weight based on the weight of the isocyanate component.

The isocyanate component usually has an NCO content of from 10 to 25 wt. % (determined according to Spielberger, DIN EN ISO 11909:2007-05), preferably 15 to 20 wt. %, and have an average NCO functionality of from 1 to 3.

According to the present invention, the ratio by weight of the polyol and isocyanate components is from 15:1 to 1:5, preferably is from 12:1 to 1:3, and more preferably from 10:1 to 2:1.

Surprisingly, the inventors have found that without using GLYMO as adhesive promoter, the adhesive compositions maintain an excellent property portfolio such as bonding strength as well as heat seal strength, and thus is suitable for being used in film lamination in hot filling application.

The composition according to the invention may further comprise additives. These additives may be used to affect the properties of the composition, for example the mechanical properties and thermal conductivity. Preferably the one or more additives are selected from the group consisting of additional filler, pigments, rheology modifiers, drying agents, flame retardants, curing agents, surface active agents and anti-foaming agents. The additives may be comprised in the polyol component and/or the isocyanate component as long as they are inert to the other ingredient.

A catalyst can be used in combination with the aliphatic or alicyclic isocyanate-functionalized compound. When a catalyst is used, a crosslinking reaction between the hydroxyl group of the polyol component and the isocyanate group of the isocyanate component is promoted. Examples of the catalyst include tertiary amine compounds and organometallic compounds.

Examples of the tertiary amine compound include triethylamine, triethylenediamine, N,N-dimethylbenzylamine, N-methylmorpholine, diazabicycloundecene (also known as DBU), and the like.

Examples of the organometallic compound include a tin compound and a non-tin compound.

Examples of the tin compound include dibutyltin dichloride, dibutyltin oxide, dibutyltin dibromide, dibutyltin dimaleate, dibutyltin dilaurate (also known as DBTDL), dibutyltin diacetate, dibutyltin sulfide, tributyltin sulfide, tributyltin oxide, Examples include tributyltin acetate, triethyltin ethoxide, tributyltin ethoxide, dioctyltin oxide, tributyltin chloride, tributyltin trichloroacetate, and tin 2-ethylhexanoate.

Examples of non-tin compounds include titanium compounds such as dibutyltitanium dichloride, tetrabutyltitanate, and butoxytitanium trichloride, lead compounds such as lead oleate, lead 2-ethylhexanoate, lead benzoate, and lead naphthenate. —Iron compounds such as iron ethylhexanoate and iron 2,4-pentadionate, cobalt compounds such as cobalt benzoate and cobalt 2-ethylhexanoate, zinc compounds such as zinc naphthenate and zinc 2-ethylhexanoate and zirconium naphthenate. Among these, diazabicycloundecene (alias: DBU), dibutyltin dilaurate (alias: DBTDL), zinc 2-ethylhexanoate and the like are preferable in terms of reactivity and hygiene.

The catalyst can be used alone or in combination of two or more.

The adhesive composition according to the present invention may contain at least one solvent or contain no solvent. If present, examples of organic solvents would include heterocyclic, aliphatic, or aromatic hydrocarbons such as toluene, isophorone, xylene, mono- or polyhydric alcohols such as ethylhexanol, butoxypropanol, isopropanol, butyl diglycol, methanol, ethanol, propanol, and butanol, ethers such as diethylene glycol dimethyl ether and dipropylene glycol methyl ether, ethyl glycol and butyl glycol, esters such as ethyl acetate, butyl acetate, pentyl acetate, or ethyl ethoxypropionate, ketones such as cyclohexanone, methyl ethyl ketone (MEK), methyl amyl ketone, methyl isobutyl ketone (MIBK), and acetone, and amides, such as N-methylpyrrolidone, N-ethylpyrrolidone, and dimethylformamide.

In the embodiment of the present invention, the polyol component is preferably mixed in an amount of 50 to 95 parts by weight (in terms of solid content), more preferably 60 to 90 parts by weight, and most preferably 70 to 90 parts by weight, based on 100 parts by weight of the total weight of all components. When the polyol component is blended in an amount within the above range, the bonding strength and heat seal strength of the adhesive for food packaging films of the present invention are more improved.

The adhesive composition for hot filling food packaging films of the present invention can be produced by mixing the components and the optional additives. There is no particular limitation on the mixing method, as long as the objective adhesive for food packaging films of the present invention can be obtained. There is also no particular limitation on the order of mixing components. The adhesive composition for food packaging films according to the present invention can be produced without requiring a special mixing method and a special order of mixing. Thus, the obtained adhesive for food packaging films is excellent in both bonding strength and heat seal strength.

In one preferred embodiment, the cured adhesive has a bonding strength of no less than 3 N/15 mm, and preferably no less than 4 N/15 mm after stored for 7 days according to DIN 53357.

In another preferred embodiment, the cured adhesive has a bonding strength of no less than 3 N/15 mm, and preferably no less than 4 N/15 mm after stored for 14 days according to DIN 53357.

In yet another preferred embodiment, the cured adhesive has a heat seal strength of no less than 40 N/15 mm, and preferably no less than 55 N/15 mm after being cured at 40° C. for 7 days and tested at 23° C. according to DIN 55529.

In yet another preferred embodiment, the cured adhesive has a heat seal strength of no less than 40 N/15 mm, and preferably no less than 55 N/15 mm after being cured at 40° C. for 14 days and tested at 23° C. according to DIN 55529.

In yet another preferred embodiment, the cured adhesive has a heat seal strength of no less than 15 N/15 mm, and preferably no less than 20 N/15 mm after being cured at 40° C. for 14 days and tested at 90° C. according to DIN 55529.

In another aspect, the present invention is directed to a flexible packaging material comprising a first layer comprised of a first polyolefin or first polyester; a second layer comprised of a second polyolefin, which may be the same or different from the first polyolefin, a second polyester, which may be the same as or different from the first polyester, or a metal foil; and cured adhesive of the present invention bonding the first layer to the second layer.

In yet another aspect, the present invention is directed to a method of making a flexible film laminate, comprising: combining the components of polyurethane adhesive composition according to the present invention at a predetermined weight ratio to form an adhesive mixture; disposing the adhesive mixture on at least a portion of one surface of a first flexible film, joining the first flexible film and a second flexible film wherein the adhesive mixture is interposed between the first flexible film and the second flexible film; and curing the adhesive mixture.

The film or films to be coated and adhered to each other using the adhesive compositions may be comprised of any of the materials known in the art to be suitable for use in flexible packaging, including both polymeric and metallic materials as well as paper (including treated or coated paper). Thermoplastics are particularly preferred for use as at least one of the layers. The materials chosen for individual layers in a laminate are selected to achieve specific desired combinations of properties, e.g., mechanical strength, tear resistance, elongation, puncture resistance, flexibility/stiffness, gas and water vapor permeability, oil and grease permeability, heat sealability, adhesiveness, optical properties (e.g., clear, translucent, opaque), formability, merchantability and relative cost. Individual layers may be pure polymers or blends of different polymers. The polymeric layers are often formulated with colorants, anti-slip, anti-block, and anti-static processing aids, plasticizers, lubricants, fillers, stabilizers and the like to enhance certain layer characteristics.

Particularly preferred polymers for use include, but not limited to, polyethylene (including low density polyethylene (LDPE), medium density polyethylene (MDPE), high density polyethylene (HPDE), high molecular weight, high density polyethylene (HMW-HDPE), linear low density polyethylene (LLDPE), linear medium density polyethylene (LMPE)), polypropylene (PP), oriented polypropylene, polyesters such as poly (ethylene terephthalate) (PET) and poly (butylene terephthalate) (PBT), ethylene-vinyl acetate copolymers (EVA), ethylene-acrylic acid copolymers (EAA), ethylene-methyl methacrylate copolymers (EMA), ethylene-methacrylic acid salts (ionomers), hydrolyzed ethylene-vinyl acetate copolymers (EVOH), polyamides (nylon), polyvinyl chloride (PVC), poly(vinylidene chloride) copolymers (PVDC), polybutylene, ethylene-propylene copolymers, polycarbonates (PC), polystyrene (PS), styrene copolymers, high impact polystyrene (HIPS), acrylonitrile-butadiene-styrene polymers (ABS), acrylonitrile copolymers (AN), polyamide (Nylon), polylactic acid (PLA), regenerated cellulose films (Cellophane).

The polymer surface may be treated or coated, if so desired. For example, a film of polymer may be metallized by depositing a thin metal vapor such as aluminium onto the film's surface. Metallization may enhance the barrier properties of the finished laminate. The polymer film surface may also be coated with anti-fog additive or the like or subjected to a pretreatment with electrical or corona discharges, or ozone or other chemical agents to increase its adhesive receptivity. A coating of an inorganic oxide such as SiOx or AlOx may also be present on the polymer surface (for example, an SiOx- or AlOx-coated PET film).

One or more layers of the laminate may also comprise a metal film or foil, such as aluminium foil, or the like. The metal foil will preferably have a thickness of about 5 to 100 μm.

The individual films comprising the laminates can be prepared in widely varying thicknesses, for example, from about 5 to about 200 microns. The films, foils, and laminating adhesive composition can be assembled into the laminate by using any one or more of the several conventional procedures known in the art for such purpose. For instance, the adhesive formulation may be applied to the surface of one or both of two films/foils by means of extrusion, brushes, rollers, blades, spraying or the like and the film/foil surfaces bearing the adhesive composition brought together and passed through a set of rollers (often referred to as nip rollers) which press together the film/foils having the adhesive composition between the films/foils. The resulting laminate may be rolled or wound onto a reel for ageing. The adhesive may be applied by conventional techniques; e.g., a ¾-roller coating mechanism in the case of the use of a solvent-free system, or a 2-roller coating mechanism in the case of the use of a solvent-containing system.

The coating weight at which the adhesive formulation can be applied to the surface of a film layer is in the range of about 0.1 to about 10 $g/m^2$, and more typically about 2.0 to about 6.0 $g/m^2$.

Generally speaking, the adhesive compositions are believed to be largely chemically cured through the reaction of the formulation constituents containing isocyanate groups and the constituents containing hydroxyl or other active hydrogen groups. However, curing can also be accomplished at least in part through moisture curing. Although sufficient moisture may be inherently present on the film or foil surfaces for this purpose, water may also be deliberately introduced through conventional methods if so desired.

Laminates prepared in accordance with the present disclosure may be used for packaging purposes in the same manner as conventional or known flexible laminated packaging films. The laminates are particularly suitable for forming into flexible pouch-shaped container vessels capable of being filed with a foodstuff and sealed. For example, two rectangular or square sheets of the laminate may be piled in the desired configuration or arrangement; preferably, the two layers of the two sheets which face each other are capable of being heat-sealed to each other. Three peripheral portions of the piled assembly are then heat-sealed to form the pouch. Heat-sealing can easily be accomplished by means of a heating bar, heating knife, heating wire, impulse sealer, ultrasonic sealer, or induction heating sealer.

The foodstuff is thereafter packed in the so-formed pouch. If necessary, gasses injurious to the foodstuff such as air are removed by known means such as vacuum degasification, hot packing, boiling degasification, or steam jetting or vessel deformation. The pouch opening is then sealed using heat. The packed pouch may be heated at a later time.

An embodiment of the food packaging film according to the present invention is exemplified in FIG. 1, but the present invention is not limited to these embodiments. FIG.

1 shows a sectional view of a food packaging film 10. This food packaging film 10 is a laminate comprising one metal foil 14 and two plastic films 12 and 13, and the plastic films 12 and 13 are adhered on both sides of the metal foil 14 by using adhesive layers 11, respectively. More specifically, the plastic film 12 is preferably, for example, a polyethylene terephthalate (PET) film, the film 13 is preferably a polyolefin film, more preferably a PE film. The metal foil 14 is inserted between them. The metal foil 14 may be, for example, an aluminum foil. The film 12 is bonded to the metal foil 14, and the film 13 is bonded to the metal foil 14 by the adhesive layers 11 for food packaging films, respectively. Examples Of the film to be laminated include plastic films produced from polyethylene terephthalates, nylons, polyethylenes, polypropylenes, and polyvinyl chlorides; metal foils such as aluminum foil; deposited films such as metal deposited films and silica deposited films; metal films produced from stainless steel, steel, copper, and lead. Moreover, the thickness of the film to be laminated, for example, plastic film is preferably within a range of 5 to 200 μm.

The invention will be illustrated in more detail by way of the following examples which are not to be understood as limiting the concept of the invention.

EXAMPLES

The following materials were used in the examples.

Diacid is a mixture of adipic acid, isophthalic acid, terephthalic acid and azelaic acid which are commercially available from Sigma-Aldrich.

Diol is a mixture of diethylene glycol (DEG) obtained from SABIC and 1,2-propane diol obtained from BASF.

1,4-Cyclohexanedimethanol (CHDM) was obtained from Eastman under the trade name of Eastman CHDM-D.

Isosorbide was obtained from Roquette under the trade name of POLYSORB PA.

Titanium(IV)isopropoxide was obtained from Sigma-Aldrich.

Ethylacetate was obtained from Brenntag.

IPDI is an isophorone diisocyanate monomer obtained from Covestro under the trade name of Desmodur I.

HDI is a 1,6-hexamethylene diisocyanate (HDI) trimer obtained from Covestro under the trade name of Desmodur N 3300.

Loctite LA 5000 is a TDI based polyisocyanate commercially available from Henkel.

Bis-AMEO is a bis[γ-(triethoxysilyl)propyl]amine obtained from Evonik under the trade name of Dynasylan 1122.

Bis-AMMO is a bis[γ-(trimethoxysilyl)propyl]amine (bis-AMMO) obtained from Evonik under the trade name of Dynasylan 1124.

Loctite LA 2775-21 is a polyester polyol component comprising GLYMO as adhesion promoter, commercially available from Henkel.

Preparation of the Polyol Component

Polyester Polyol 1 (Inventive)

66 parts by weight of diacid, 23 parts by weight of diol, 10 parts by weight of CHDM, and 15 parts by weight of isosorbide were weighted into the flask and nitrogen was added. The heater was set to 220° C., the progress of the condensation reaction could be followed by the formation of water. Once no more water was generated 0.02 part by weight of titanium(IV)isopropoxide was added. The reaction was tracked via the acid value. Once the acid value was determined below 2 mgKOH/g the reaction was finished and a liquid polyester polyol was obtained. After the polyester polyol was cooled down and filled into suitable glasses the OH-value was measured for final specification.

Polyester Polyol 2 (Comparative)

66 parts by weight of diacid, 23 parts by weight of diol, and 25 parts by weight of isosorbide were weighted into the flask and nitrogen was added. The heater was set to 220° C., the progress of the condensation reaction could be followed by the formation of water. Once no more water was generated 0.02 part by weight of titanium(IV)isopropoxide was added. The reaction was tracked via the acid value. Once the acid value was determined below 2 mgKOH/g the reaction was finished and a liquid polyester polyol was obtained. After the polyester polyol was cooled down and filled into suitable glasses the OH-value was measured for final specification.

Polyester Polyol 3 (Comparative)

66 parts by weight of diacid, 13 parts by weight of diol, 30 parts by weight of CHDM, and 5 parts by weight of isosorbide were weighted into the flask and nitrogen was added. The heater was set to 220° C., the progress of the condensation reaction could be followed by the formation of water. Once no more water was generated 0.02 part by weight of titanium(IV)isopropoxide was added. The reaction was tracked via the acid value. Once the acid value was determined below 2 mgKOH/g, the reaction was finished and a polyester polyol in a solid form was obtained and could not be further processed. The polyester polyol was not suitable for formulating adhesive formulation.

Preparation of the Isocyanate Component

Isocyanate Component 1 (Inventive)

In the first step about 50 parts by weight of HDI trimer were weighted into a flask. The isocyanate was heated up to 40° C. and stirred. Within 1 hour about 20 parts by weight of Bis-AMEO was carefully added. The temperature was consistently measured and should not exceed 80° C., cooling with water may be necessary. When the addition of the aminosilane was completed, the mixture was stirred for additional 30 minutes. Then ethyl acetate as solvent was added and the NCO value was determined. Then the reaction product of isocyanate and aminosilane was then added to a mixture of HDI trimer (about 20 parts by weight) and TDI trimer (about 40 parts by weight) and solvent and mixed for 1 hour at 40° C. to obtain the isocyanate component.

Isocyanate Component 2 (Inventive)

In the first step about 50 parts by weight of IPDI monomer were weighted into a flask. The isocyanate was heated up to 40° C. and stirred. Within 1 hour about 20 parts by weight of Bis-AMMO was carefully added. The temperature was consistently measured and should not exceed 80° C., cooling with water may be necessary. When the addition of the aminosilane was completed, the mixture was stirred for additional 30 minutes. Then ethyl acetate as solvent was added and the NCO value was determined. Then the reaction product of isocyanate and aminosilane was then added to a mixture of HDI trimer (about 20 parts by weight) and TDI trimer (about 40 parts by weight) and solvent and mixed for 1 hour at 40° C. to obtain the isocyanate component.

Isocyanate Component 3 (Comparative)

In the first step about 50 parts by weight of IPDI monomer were weighted into a flask. The isocyanate was heated up to 40° C. and stirred. Within 1 hour about 20 parts by weight of Bis-AMEO was carefully added. The temperature was consistently measured and should not exceed 80° C., cooling with water may be necessary. When the addition of the aminosilane was completed, the mixture was stirred for additional 30 minutes. Then ethylacetate as solvent was added and the NCO value was determined. Then the reaction product of isocyanate and aminosilane was then added to a mixture of HDI trimer (about 20 parts by weight) and IPDI trimer (about 40 parts by weight) and solvent and mixed for 1 hour at 40° C. to obtain the isocyanate component.

Examples 1 and 2 and Comparative Examples 1 to 3

Examples of adhesive compositions for food packaging films were produced by mixing the respective components according to the formulations shown in Table 1 in ethyl acetate.

TABLE 1

Formulations of adhesive compositions (mixing ratio by weight)

| Formulation | Ex. 1 | Ex. 2 | CEx. 1 | CEx. 2 | CEx. 3 |
|---|---|---|---|---|---|
| Polyester polyol 1 | 6.5 | 6.5 | — | — | 6.5 |
| Polyester polyol 2 | — | — | — | 6.5 | — |
| LA 2775-21 | — | — | 5 | — | — |
| Isocyanate Component 1 | 1 | — | — | — | — |
| Isocyanate Component 2 | — | 1 | — | 1 | — |
| Isocyanate Component 3 | — | — | — | — | 1 |
| LA 5000 | — | — | 1 | — | — |

The adhesive compositions for food packaging films and samples for evaluation test were produced as follows.

The polyester polyols according to the invention were each converted together with an NCO-terminated compound to a laminating adhesive. A constant addition ratio NCO/OH was chosen. The reactive adhesive mixture obtained was diluted with ethyl acetate to a solid content of 25%.

The substrates to be coated were formatted to DIN A4 size. A PET/Aluminium carrier foil duplex was coated with 4 g/$m^2$ of the reactive adhesive mixture. The carrier film thus coated was then dried for 1 minutes at 90° C. in a drying oven. Then the polyethylene film was pressed against the coated side. The composites produced in this way were cured under pressure (weighted 8 kg) between metal plates at 40° C. in the drying oven.

The obtained adhesive compositions for food packaging films were evaluated by the following test procedures and the testing results are shown in Table 2.

Bonding Strength after Storage at 40° C. after 7 Days and 14 Days

After the laminates were prepared and stored at 40° C. for 7 and 14 days, the bonding strength values of the adhesive were measured according to DIN 53357.

Heat Seal Strength Tested at 23° C. after 7 Days and 14 Days

After the laminates were prepared and stored for 7 and 14 days, the heat seal strength values of the adhesive were measured at 23° C. according to DIN 55529.

Heat Seal Strength Tested at 90° C. after 14 Days

After the laminates were prepared and stored for 14 days, the heat seal strength values of the adhesive were measured at 90° C. according to DIN 55529.

TABLE 2

Testing results of bonding strength and heat seal strength

| Items | Ex. 1 | Ex. 2 | CEx. 1 | CEx. 2 | CEx. 3 |
|---|---|---|---|---|---|
| Bonding strength after 7 days (N/15 mm) | 7.5 | 14.0 | 8.2 | 2.5 | 6.8 |
| Bonding strength after 14 days (N/15 mm) | 6.8 | 8.2 | 9.3 | 3.4 | 6.5 |
| Heat seal strength at 23° C. after 7 days (N/15 mm) | 63.0 | 63.3 | 61.7 | 45.0 | 61.1 |
| Heat seal strength at 23° C. after 14 days (N/15 mm) | 63.0 | 65.0 | 62.0 | 48.3 | 60.2 |
| Heat seal strength at 90° C. after 14 days (N/15 mm) | 21.8 | 23.9 | 25.2 | 9.0 | 20.6 |

As can be seen from Table 2, the inventive examples exhibited excellent bonding strength and heat seal strength even after being treated under high demanding conditions. The bonding strength and heat seal strength of the other comparative examples using adhesive composition having no CHDM, conventional polyol or isocyanate component were deteriorated compared to the inventive examples.

The invention claimed is:

1. A two-component polyurethane adhesive composition comprising a polyol component and an isocyanate component, wherein the polyol component comprises at least one polyester polyol obtained from a reaction mixture comprising, based on the total weight of the reaction mixture, from 1% to 25% by weight of at least one cycloaliphatic polyol, from 1% to 40% by weight of at least one heterocyclic polyol, from 1% to 40% by weight of at least one linear or branched aliphatic polyol, and from 30% to 70% by weight of at least one polyfunctional carboxylic acid, and the isocyanate component comprises at least one alkoxysilane functionalized isocyanate compound having no epoxide group, at least one aromatic isocyanate-functionalized compound, and at least one aliphatic or alicyclic isocyanate-functionalized compound.

2. The adhesive composition according to claim 1, wherein the cycloaliphatic polyol is selected from 1,4-cyclohexanedimethanol, cyclobutanediol, cyclopentanediol, 1,4-cyclohexanediol, cycloheptanediol, cyclooctanediol, cyclohexanedimethanol, tricyclo [5.2.1.0.2.6] decanedimethanol, bicyclo [4.3.0]-nonanediol, dicyclohexanediol, tricyclo [5.3.1.1] dodecanediol, bicyclo [4.3.0] nonanedimethanol, tricyclo [5.3.1.1] dodecanediethanol, spiro [3.4] octanediol, butylcyclohexanediol, 1,1'-bicyclohexylidenediol, cyclohexanetriol, hydrogenated bisphenol A, 1,3-adamantanediol, and combination thereof.

3. The adhesive composition according to claim 1, wherein, the heterocyclic polyol is selected from 1,4:3,6-dianhydrohexitol, spiroglycol, 2,4:3,5-di-O-methylenemannitol, 2,3:4,5-di-O-methylenegalactose, and combinations thereof.

4. The adhesive composition according to claim 1, wherein the alkoxysilane functionalized isocyanate compound is a reaction product of at least one aliphatic or alicyclic isocyanate-functionalized compound and at least one hydrolyzable alkoxysilane compound having no epoxide group, the alkoxysilane functionalized isocyanate compound comprising a functional group that is reactive toward isocyanate groups.

5. The adhesive composition according to claim 4, wherein the aliphatic or alicyclic isocyanate-functionalized compound is selected from 1,6-hexamethylene diisocyanate (HDI), isophorone diisocyanate (IPDI), xylyl diisocyanate (XDI), an adduct thereof, an oligomer thereof, or a mixture of above.

6. The adhesive composition according to claim 5, wherein the aromatic isocyanate-functionalized compound is selected from toluene diisocyanate (TDI), the adduct thereof, the oligomer thereof, and the mixture of above.

7. The adhesive composition according to claim 4, wherein the hydrolyzable alkoxysilane compound having no epoxide group is selected from α-aminomethyltrimethoxysilane, α-aminomethylmethyldimethoxysilane, α-aminomethyldimethylmethoxysilane, α-aminomethyltriethoxysilane, α-aminomethylmethyldiethoxysilane, α-aminomethyldimethylethoxysilane, γ-aminopropyltrimethoxysilane, γ-aminopropylmethyldimethoxysilane, γ-aminopropyldimethylmethoxysilane, γ-aminopropyltriethoxysilane, γ-aminopropylmethyldiethoxysilane, γ-aminopropyldimethylethoxysilane, N-2(aminoethyl) α-aminomethyltrimethoxysilane, N-2(aminoethyl) α-aminomethylmethyldimethoxysilane, N-2(aminoethyl) α-aminomethyldimethylmethoxysilane, N-2(aminoethyl) α-aminomethyltriethoxysilane, N-2(aminoethyl) α-aminomethylmethyldiethoxysilane, N-2(aminoethyl) α-aminomethyldimethylethoxysilane, bis-(trimethoxysilylpropyl) amine, bis-(methyldimethoxysilylpropyl) amine, bis-(dimethylmethoxysilylpropyl) amine, bis-(triethoxysilylpropyl) amine, bis-(methyldiethoxysilylpropyl) amine, bis-(dimethylethoxysilyipropyl) amine, and mixture thereof, and preferably is selected from bis-(trimethoxysilylpropyl) amine and/or bis-(methyldimethoxysilylpropyl) amine.

8. The adhesive composition according to claim 1, wherein the ratio by weight of the polyol and isocyanate components is from 15:1 to 1:5.

9. A cured adhesive obtainable by curing an adhesive composition according to claim 1.

10. The cured adhesive according to claim 9, having a heat seal strength of no less than 55 N/15 mm after being cured at 40° C. for 7 days and tested at 23° C. according to DIN 55529.

11. The cured adhesive according to claim 9, having a heat seal strength of no less than 15 N/15 mm; after being cured at 40° C. for 14 days and tested at 90° C. according to DIN 55529.

12. A flexible packaging material comprising a first layer comprised of a first polyolefin or first polyester; a second layer comprised of a second polyolefin, which may be the same or different from the first polyolefin, a second polyester, which may be the same as or different from the first polyester, or a metal foil;

and cured reaction products of the adhesive composition of claim 1 bonding the first layer to the second layer.

13. A method of making a flexible film laminate, comprising:

combining the components of the two-component polyurethane adhesive composition according to claim 1 at a predetermined weight ratio to form an adhesive mixture;

disposing the adhesive mixture on at least a portion of one surface of a first flexible film, joining the first flexible film and a second flexible film wherein the adhesive mixture is interposed between the first flexible film and the second flexible film; and curing the adhesive mixture.

* * * * *